Nov. 4, 1958    J. E. DAVIS    2,859,426
INSTRUMENT TAXIING SYSTEM
Filed April 18, 1956

INVENTOR
JAMES E. DAVIS
BY
ATTORNEYS

United States Patent Office 2,859,426
Patented Nov. 4, 1958

2,859,426
INSTRUMENT TAXIING SYSTEM
James E. Davis, Arcata, Calif.
Application April 18, 1956, Serial No. 579,120
6 Claims. (Cl. 340—22)
(Granted under Title 35, U. S. Code (1952), sec. 266)

The invention described herein may be manufactured and used by or for the Government of the United States of America for governmental purposes without the payment of any royalties thereon or therefor.

The present invention relates to an instrument taxiing system.

Frequently, fog, darkness, etc., obstructs the vision of a pilot who is taxiing an aircraft, and visual indication must be provided him so that he can determine the position of his plane with respect to the aircraft ground paths. That is, the pilot needs to have knowledge of the position of his plane with respect to the edges of the runway or taxiway on which he is taxiing and also he should have knowledge of any approaching turn-offs, turns, or ends in this ground path. One method of providing this visual information is through the use of taxiway lights, but this method has a disadvantage in that the lights cannot be seen during very low visibility conditions far enough ahead to furnish the pilot with enough information to taxi from the runway to the parking areas with sufficient speed in order to clear other airplanes for landing. Also, the present taxiway lights are not adequate for low visibility taxiing and on fields where numerous taxiways are available for use, turn-offs are confusingly marked even for clear weather night operation. Another method is called "follow-me jeeps" and is impractical to use where more than one or two airplanes are involved due to the presence on the landing field of the vehicles required in this method. The taxiway radar method is still in the experimental stages and when developed will probably have disadvantages of high initial cost and large manpower requirements for operation and maintenance.

In the present invention signal lines are buried in shallow trenches along the edges of the aircraft ground paths on the airfield, i. e., the taxiways and runways. Several oscillators are utilized to energize these signal lines so that the radio waves propagated from the line along one edge of each ground path is of a different frequency from those propagated from the line along the opposite edge. Each airplane is provided with two antennas which are located on opposite extremities of the airplane so as to be adjacent the edges of the ground paths when the plane is in a normal taxiing position. In each airplane, a dual channel amplifier amplifies the signals from the antennas in separate channels and these signals are passed to a single indicator which provides an indication of the difference in intensities of the two signals received from the lines buried along the edges of the ground path upon which the aircraft is moving. By observing the deflection of a needle on the indicator the pilot in the airplane can determine whether he is right or left of the center line of the ground path. To provide advance warning of a turn-off or turn, the signal line along the ground path edge on the side of the turn is laid at a near-right angle to the ground path at a short distance from the turn so that the signal strength is reduced in the antenna on that side of the airplane and the needle on the indicator kicks to the right or left depending upon the direction of the turn. With the use of this system, the pilot can move the airplane at a much higher speed with confidence than can be done with the use of taxiway lights or "follow-me jeeps," particularly during low visibility conditions. With the advanced turn-off warning, the pilot does not have to grope his way from one light to the next, not knowing which light will indicate a turn. In addition, the present system furnishes guidance when the aircraft is crossing wide runways or where runways or taxiways intersect. Also, the need for voice instructions from the control tower is minimized. This eliminates or reduces the danger resulting from "dead" spots which are created by the radiation of the towers and airplane antennas. Even with taxiway radar, voice communications are still necessary and these instructions can be misunderstood and hence, visual information is desirable. Thus, the present invention furnishes a visual indication in the cockpit, so that the pilot can determine his position relative to the taxiway or runway center line and also furnishes an advanced indication of a turn-off or turn point some distance ahead of that point, and hence, the invention provides additional guidance to pilots to expedite the movements of airplanes from runways to parking, loading and unloading areas and vice versa.

Accordingly, an object of the present invention is the provision of a system for providing visual ground path information to the pilot of a landing aircraft so that he can quickly clear his aircraft from the runway regardless of ambient visibility conditions.

Another object is to provide a system for providing visual information to the pilot of a taxiing airplane so that he can determine his position with respect to the edges of a taxiway or runway.

A further object of the invention is the provision of a system for furnishing a visual indication in the cockpit of a taxiing aircraft for the pilot of that aircraft so that he can determine his position relative to the taxiway or runway center line and also for providing an advanced indication of a turn or turn-off point some distance before the aircraft reaches that point.

Other objects and many of the attendant advantages of this invention will be readily appreciated as the same becomes better understood by reference to the following detailed description when considered in connection with the accompanying drawings wherein.

Figure 1:
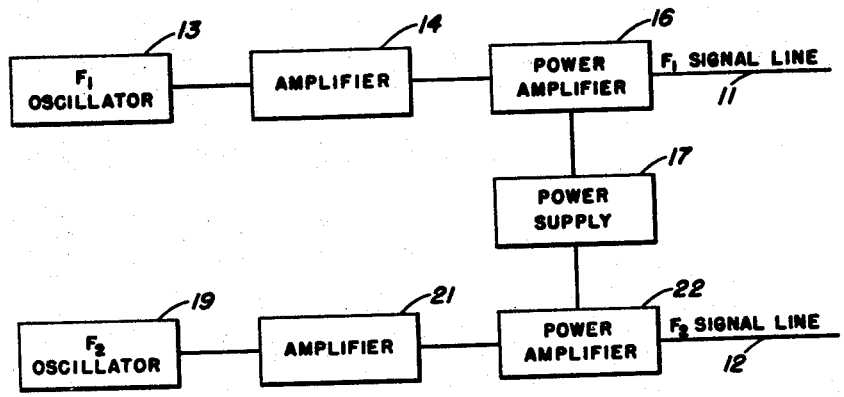
Fig. 1 shows a block diagram of a preferred embodiment of the portion of the invention that is utilized on the landing field.

Referring now to the drawings wherein like reference characters designate like or corresponding parts throughout the several figures, in Fig. 1 there is shown a signal line 11 which is laid along one edge of a ground path and another signal line 12 which is laid on the opposite side of the same ground path. Oscillator 13 generates a signal at a frequency F1 which is amplified by amplifier 14, and this amplified signal is utilized by power amplifier 16 to control the energy supplied by power supply 17 to signal line 11. Oscillator 19 generates a signal at a different frequency F2 which is amplified by amplifier 21 and this amplified signal is utilized by power amplifier 22 to control the energy supplied to signal line 12 from power supply 17. The frequencies F1 and F2 should be below the radio frequency range, otherwise their respective signals will radiate all over the landing field and quite likely will be picked up at other than desired points.

Figure 2:
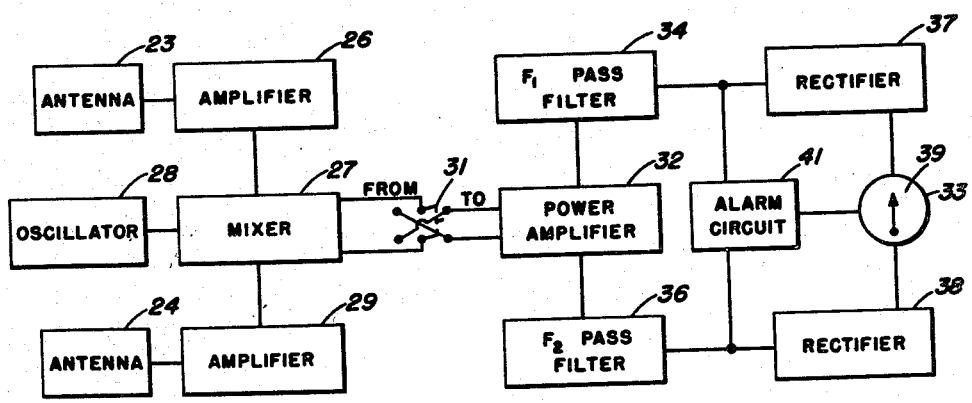
Fig. 2 illustrates a preferred embodiment of the portion of the invention that is utilized on each aircraft.

The portion of the invention shown in Fig. 2 is located on each aircraft and is placed in operation when the respective aircraft is moving on the ground. The two antennas 23 and 24, which may be loop antennas, can be placed, one on each main landing gear or one on each wing tip, or any other extremities of the aircraft that would normally be near the edges of the ground paths. Of course, these antennas are provided with a non-conductive cover (not shown) so as not to shield the antennas from the signals from lines 11 and 12. The signal picked up from antenna 23 is amplified in amplifier 26 and conducted to mixer 27 where it is mixed with a signal from oscillator 28. The signal picked up by antenna 24 is amplified in amplifier 29 and then the amplified signal is conducted to mixer 27 where it is mixed with a signal from oscillator 28. The signals from antennas 23 and 24 are kept separate in mixer 27, as they are in all portions of the circuit, so that there will be no ambiguity. The two signals from mixer 27 are passed through double-pole double-throw switch 31 to power amplifier 32 which is a dual channel, high-gain, high-sensitivity narrow band pass amplifier. Antenna 23 or antenna 24 may pick up a signal of frequency F1 or of F2 depending upon whether the airplane on which these antennas are situated is taxiing to or from a runway, therefore switch 31 is provided with a "to" and "from" designation to give an indication to the pilot as to whether he is taxiing to or from the runway. When switch 31 is in one position it switches the output from antenna 23 to one channel of amplifier 32 and when switch 31 is in its other position it switches the output from antenna 23 to the other channel of power amplifier 32. This is true also of the output from antenna 24 except that it is always on a channel different from the one being energized by the output from antenna 23. Since it is known beforehand from which respective sides of the taxiways the signals F1 and F2 are propagating, switch 31 can be calibrated with a "to" or "from" designation and t'.e pilot can determine whether he is taxiing to or from the runway by noting which position of switch 31 provides an indication on indicator 33. One channel of power amplifier 32 is joined to the input of pass filter 34 which filters out all signals in this one channel except the signal of frequency F1. Filter 36 is joined to the other channel of power amplifier 32 and filters out all frequencies from that channel except those of frequency F2. The outputs of filters 34 and 36 are fed to rectifiers 37 and 38, respectively, which in turn feed different inputs of indicator 33 so that the indication provided by needle 39 is the difference in the outputs of rectifiers 37 and 38. Alarm circuit 41, which is connected between the outputs of filters 34 and 36, is arranged to give an alarm when there is a malfunction of any of the equipment in this system. The alarm can take many forms but is shown to energize indicator 33 to deflect needle 39 in some manner such as by rotation. When there are outputs from filters 34 and 36, there is no malfunction of the equipment; however, when one or both of the filters provides no output when the aircraft is on a taxiway or runway, there is some defect in the system components, thus, alarm circuit 41 detects the lack of output from filter 34 or filter 36 or both and energizes indicator 33 accordingly.

Figure 3:
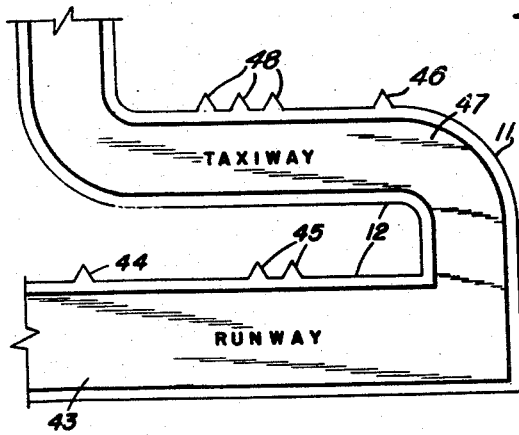
Fig. 3 shows the signal lines as they would be laid near the end of a runway.

One suitable method of providing an indication of runway turn-off is shown in Fig. 3. At a suitable number of feet before the turn-off of runway 43, a sharp bend or deviation 44 is made in signal line 12. This deviation is made in a direction such that the indicator needle 39 on indicator 33 deflects in the direction of the turn-off. Other deviations 45 may also be provided if desired, and the number of deviations can be used to designate the particular turn-off. In a similar manner a sharp bend or deviation 46 is made in signal line 11 for indicating a turn-off of taxiway 47. Deviation 46 is made in the direction of the turn-off so needle 39 on indicator 33 will deflect in the direction of the turn-off of taxiway 47. Deviations 48 are of a different number than deviations 45 to indicate a different turn-off.

Assuming, for an explanation of the operation of the present system, that signal line 11 is located at the left side of the taxiway on which an airplane is approaching a runway and that antenna 23 is on the left wing of the airplane; if switch 31 is thrown in the "to" direction, the signal having frequency F1 is picked up by antenna 23 and passed to filter 34 and rectifier 37 and the signal of frequency F2 is picked up by antenna 24 and passed through filter 36 and rectifier 38 to energize indicator 39. As the airplane deviates from the center line of the taxiway the signal picked up by antenna 23 becomes either weaker or stronger and the signal from antenna 24 correspondingly is stronger or weaker as antenna 23 goes farther away and closer to the signal line 11. Of course, when antenna 23 approaches signal line 11, antenna 24 is at a relatively far distance from signal line 12 and therefore there exists an unbalanced signal condition and a resulting deviation of needle 39 to the right indicating to the pilot that he should turn his aircraft a little to the right. A similar operation occurs if the aircraft is on the other side of the center line that is nearest signal line 12, except that the needle 39 deflects then to the left rather than to the right. If the aircraft is going from the runway while switch 31 is in the "to" position, antenna 23 picks up frequency F2 and antenna 24 picks up frequency F1. There is then no indication given by needle 39 because frequency F2 is fed to filter 34 and supressed therein and frequency F1 is fed and suppressed in filter 36. The pilot notes that there is no indication on indicator 39 and then switches switch 31 to the "from" position, and an indication is then provided by needle 39 informing the pilot whether he is to the right or to the left of the center line of the taxiway. If there is a deviation in signal line 11 or 12, the signal to antenna 23 or antenna 24 diminishes and needle 39 gives a kick indicating the presence of the deviation in the signal line; the pilot then knows that he is approaching a turn-off, turn, or end in the ground path.

All of the components shown in block diagram form in Figs. 1 and 2 are well known in the art and circuits suitable for performing their functions can be obtained from nearly any electronics text book. A part of the radio receiving equipment RC-103-A can be used as well as the localizer equipment of the I-101-C or I-101-D indicator for the visual indicator of this system.

Although the prefered embodiment utilizes two oscillators each of a different frequency, one connected to the signal line on one side of a ground path and the other connected to the signal line on the other side of the ground path, one oscillator could be used which would energize a signal line laid in the center of the ground path; however, the pilot could not then determine whether he was taxiing to or from a runway.

It is to be noted that the present invention is not limited to providing visual taxiing information to the pilot in an aircraft. Through the use of suitable servo-mechanisms, the invention may be used to steer automobiles along highways and ships through narrow channels in a manner similar to the present day use of autopilots in airplanes.

Obviously many modifications and variations of the present invention are possible in the light of the above teachings. It is therefore to be understood that within the scope of the appended claims the invention may be practiced otherwise than as specifically described.

What is claimed is:

1. An instrument taxiing system for providing visual information to a pilot taxiing an aircraft on a landing field comprising: a first signal line laid along one edge of the ground paths of the landing field, a second signal line laid along the opposite edges of the ground paths, first oscillator means for generatnig a signal of a first frequency, second oscillator means for generating a signal of a second frequency different from said first frequency, first amplifier means for amplifying the signal from said first oscillator means, second amplifier means for amplifying the signal from said second oscillator means, power supply means, first power amplifier means energized by said power supply means and fed by said first amplifier means for energizing said first signal line with a signal of said first frequency, second power amplifier means energized by said power supply and fed by said second amplifier means for feeding said second frequency to said second signal line; signal pick-up and indicating means located on said taxiing aircraft comprising: first antenna means located on one side extremity of said aircraft, second antenna means located on an opposite side extremity of said aircraft, first signal amplifier means for amplifying the output of said first antenna means, second signal amplifier means for amplifying the output from said second antenna means, oscillator means, mixing means for producing a first mixed output comprising the mixed signals from the outputs of said first signal amplifier means and said oscillator means and for producing a second mixed output comprising the mixed signals from the outputs of second signal amplifier means and said oscillator means, a power amplifier having two channels, a double-pole double-throw switch connecting the two mixed outputs from said mixer to the inputs of said power amplifier and having two switch positions whereby each of said mixed outputs is connected to a different channel of said power amplifier when said double-pole double-throw switch is in one switch position and this connection is reversed when said double-pole double-throw switch is in its other switch position, a first filter connected to one output channel of said power amplifier for passing only those signals of said first frequency, a second filter connected to the other output channel of said power amplifier for passing only those signals of said second frequency, a first rectifier connected to the output of said first filter, a second rectifier connected to the output of said second filter, an indicator for providing an indication of the difference of the outputs of said first rectifier and second rectifier, and an alarm circuit connected between the outputs of said first filter and said second filter for providing an alarm when there is a malfunction of any of the components of said taxiing system.

2. An instrument taxiing system for providing a visual indication of the location of an aircraft on a ground path to the pilot of the aircraft, said system comprising: a landing field portion comprising: a first signal line located along one edge of the ground path, a second signal line located along the opposite edge of the ground path, means for energizing said first signal line with a signal of a first frequency whereby an electromagnetic wave of said first frequency is radiated from said first signal line, and means for energizing said second signal line with a signal of a second frequency different from said first frequency whereby an electromagnetic wave of said second frequency is radiated from said second signal line; and an aircraft portion comprising: a first antenna located on one side of the taxiing aircraft, a second antenna located on the other side of the aircraft, a first amplifier for amplifying the signal picked up by said first antenna, a second amplifier for amplifying the signal picked up by said second antenna, an oscillator, a mixer for producing a first mixed output comprising mixed signals from said first amplifier and said oscillator and for providing a second mixed output comprising the mixed signals from said second amplifier and said oscillator, a power amplifier having dual channels, switch means for connecting said first mixed output to one channel and said second mixed output to the other channel of said power amplifier when said switch means is in a first switch position and for reversing these connections when said switch means is in another switch position, a first pass filter connected to the output of one channel of said power amplifier for passing signals only of said first frequency, a second pass filter connected to the other channel of said power amplifier for passing only those signals of said second frequency, a first rectifier connected to the output of said first filter, a second rectifier connected to the output of said second filter, an indicator connected to indicate the difference between the outputs of said first rectifier and said second rectifier, an alarm circuit connected between the outputs of said first filter and said second filter for giving an alarm upon occurrence of a malfunction of the equipment of said taxiing system.

3. An instrument taxiing system for providing taxiing information to the pilot taxiing an aircraft on a ground path, said system comprising: first means located along one edge of the ground path for radiating a signal of a first frequency, second means located along an opposite edge of said ground path for radiating a signal of a second frequency, a first antenna located near one width extremity of the taxiing aircraft, a second antenna located near the other width extremity of the taxiing aircraft, a dual channel power amplifier, switch means having two switch positions and when in one switch position for connection the output of said first antenna to one channel of said power amplifier and for connecting the output of said second antenna to the other channel of said power amplifier and when in the other switch position for reversing these connections, a first filter connected to the output of one channel of said power amplifier for passing only those signals of said first frequency, a second filter connected to the other channel of said power amplifier for passing only those signals of said second frequency, indicator means connected between the outputs of said first filter and said second filter for providing an indication of the difference in magnitude between the outputs of the respective filters, and an alarm circuit connected between the outputs of said filters for providing an alarm when either of the outputs from said filters is zero when the airplane is taxiing.

4. In an instrument taxiing system for providing visual taxiing information to a pilot who is taxiing an aircraft, an aircraft receiver portion comprising: first antenna means located on one side extremity of said aircraft, second antenna means located on the opposite side extremity of said aircraft, first signal amplifier means for amplifying the output of said first antenna means, second signal amplifier means for amplifying the output from said second antenna means, oscillator means, mixing means for producing a first output comprising a mixed signal of the outputs of said first signal amplifier means and said oscillator means and for producing a second output comprising a mixed signal of the outputs of said second signal amplifier means and said oscillator means, a power amplifier having two channels, a double-pole double-throw switch connecting the two output signals from said mixer to the channels of said power amplifier and having two switch positions whereby each of said mixed signals is connected to a different channel when said double-pole double-throw switch is in one switch position and this connection is reversed when said double-pole double-throw switch is in its other switch position, a first filter connected to the output of one channel of said power amplifier for passing only those signals of a first frequency, a second filter connected to the other output channel of said power amplifier for passing only those signals of a second frequency different from said first frequency, a first rectifier connected to the output of said first filter, a second rectifier connected to the output of said second filter, and an indicator for providing an indication of the difference in the outputs of said first and second rectifiers.

5. In an instrument taxiing system for providing a visual indication of the location of an aircraft being taxied on a ground path to the pilot who is taxiing the aircraft, an aircraft portion comprising: a first antenna located on one side of the taxiing aircraft, a second antenna located on the other side of the aircraft, a first amplifier for amplifying the signal picked up by said first antenna, a second amplifier for amplifying the signal picked up by said second antenna, an oscillator, a mixer for producing a first mixed output comprising mixed signals from said first amplifier and said oscillator and for providing a second mixed output comprising mixed signals from said second amplifier and said oscillator, a power amplifier having dual channels, switch means for connecting said first mixed output to one channel and said second mixed output to the other channel of said power amplifier when said switch means is in a first switch position and for reversing these connections when said switch means is in another switch position, a first pass filter connected to the output of one channel of said power amplifier for passing only signals of a first frequency, a second pass filter connected to the other channel of said power amplifier for passing only signals of a second frequency different from said first frequency, a first rectifier connected to the output of said first filter, a second rectifier connected to the output of said filter, and an indicator connected to indicate the difference between the outputs of said first rectifier and said second rectifier.

6. An instrument taxiing system for providing visual information to a pilot taxiing an aircraft on a landing field comprising: a first signal line laid along one edge of the ground paths of the landing field, said first signal line having short deviations away from the edges of the adjacent ground paths in the vicinity of turns that are in a first direction, a second signal line laid along the opposite edges of the ground paths, said second signal line having short deviations away from the edges of the adjacent ground paths in the vicinity of turns that are in a second direction, first oscillator means for generating a signal of a first frequency, second oscillator means for generating a signal of a second frequency different from said first frequency, first amplifier means for amplifying the signal from said first oscillator means, second amplifier means for amplifying the signal from said second oscillator means, power supply means, first power amplifier means energized by said power supply means and fed by said first amplifier means for energizing said first signal line with a signal of said first frequency, second power amplifier means energized by said power supply and fed by said second amplifier means for feeding said second frequency to said second signal line; signal pickup and indicating means located on said taxiing aircraft comprising: first antenna means located on one side extremity of said aircraft, second antenna means located on an opposite side extremity of said aircraft, first signal amplifier means for amplifying the output of said first antenna means, second signal amplifier means for amplifying the output from said second antenna means, oscillator means, mixing means for producing a first mixed output comprising the mixed signals from the outputs of said first signal amplifier means and said oscillator means and for producing a second mixed output comprising the mixed signals from the outputs of second signal amplifier means and said oscillator means, a power amplifier having two channels, a double-pole double-throw switch connecting the two mixed outputs from said mixer to the inputs of said power amplifier and having two switch positions whereby each of said mixed outputs is connected to a different channel of said power amplifier when said double-pole double-throw switch is in one switch position and this connection is reversed when said double-pole double-throw switch is in its other switch position, a first filter connected to one output channel of said power amplifier for passing only those signals of said first frequency, a second filter connected to the other output channel of said power amplifier for passing only those signals of said second frequency, a first rectifier connected to the output of said first filter, a second rectifier connected to the output of said second filter, an indicator for providing an indication of the difference of the outputs of said first rectifier and second rectifier, and an alarm circuit connected between the outputs of said first filter and said second filter for providing an alarm when there is a malfunction of any of the components of said taxiing system.

References Cited in the file of this patent

UNITED STATES PATENTS

| | | |
|---|---|---|
| 2,317,400 | Paulus | Apr. 27, 1943 |
| 2,339,291 | Paulus | Jan. 18, 1944 |
| 2,493,755 | Ferrill | Jan. 10, 1950 |